Jan. 8, 1952 — L. J. COMBE — 2,581,633
PANORAMIC CAMERA SPRING MOTOR
Filed Jan. 6, 1950 — 2 SHEETS—SHEET 1
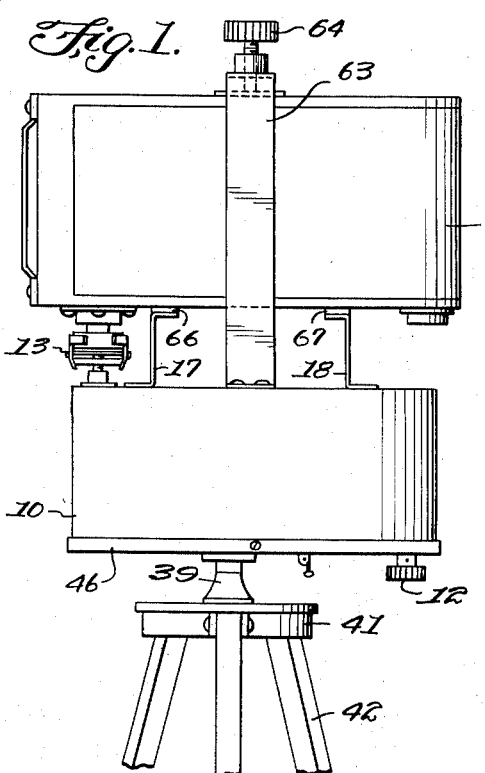
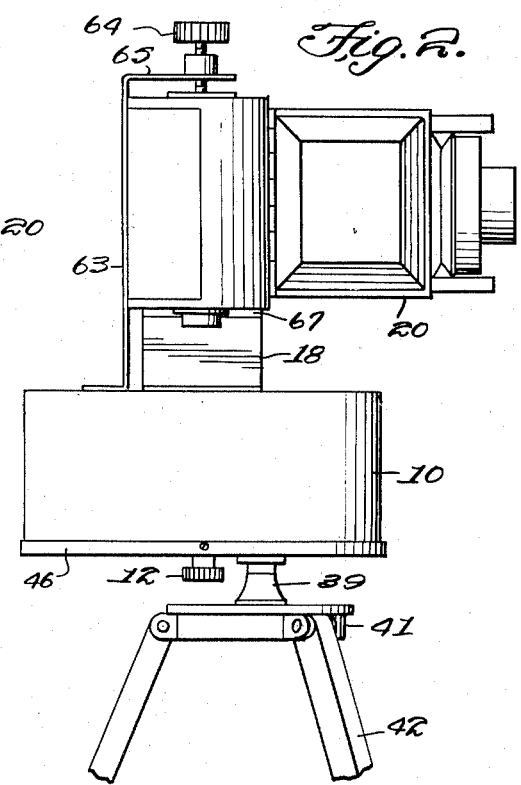
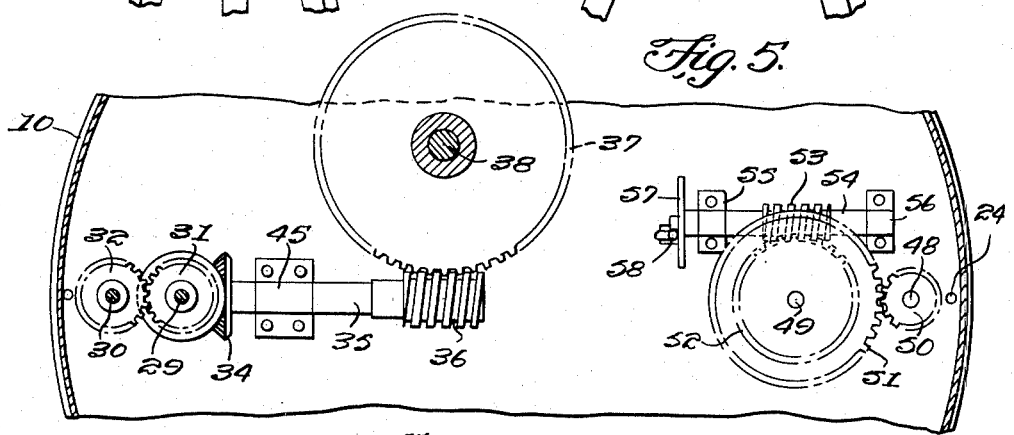
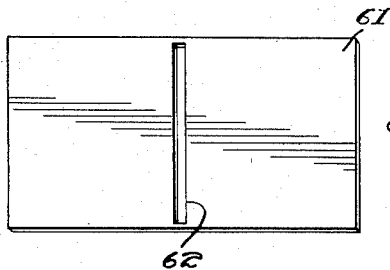
INVENTOR.
Louis J. Combe,
BY Victor J. Evans & Co.
ATTORNEYS Jan. 8, 1952

L. J. COMBE 2,581,633

PANORAMIC CAMERA SPRING MOTOR

Filed Jan. 6, 1950

INVENTOR.
Louis J. Combe,
BY Victor J. Evans & Co.
ATTORNEYS

Patented Jan. 8, 1952

2,581,633

UNITED STATES PATENT OFFICE 2,581,633

PANORAMIC CAMERA SPRING MOTOR

Louis J. Combe, Riverside, Calif.

Application January 6, 1950, Serial No. 137,055

1 Claim. (Cl. 185—37)

This invention relates to photographic equipment of the type used for rotating cameras using roll film for taking panoramic pictures, and in particular the invention relates to a casing having a spring actuated gear train for turning the camera and actuating the film winding mechanism of the camera with the operating parts synchronized.

The purpose of this invention is to provide a device on which a camera may be placed which turns the camera laterally and at the same time operates a film winding mechanism so that a camera may be set to take a landscape or panoramic view and whereby the camera is operated by mechanical means without the danger of shifting or fogging by manual operation thereof.

Devices have been provided for turning cameras for taking panoramic views but it has been found difficult to rotate the camera and at the same time operate a film winding mechanism of the camera with the parts synchronized. With this thought in mind this invention contemplates a spring actuated clock movement wherein the same gears rotate the device and also actuate a camera thereon whereby the movement of a film through the camera is synchronized with the travel of the camera.

The object of this invention is, therefore, to provide a spring motor power unit on which a camera may be positioned in which means is provided for rotating the unit on a stand on which it is mounted and also for actuating a film winding mechanism of a camera on the unit.

Another object of the invention is to provide means for rotating a camera and at the same time actuating a film winding mechanism of the camera in which the device may be used for different types of cameras.

A further object of the invention is to provide a device for actuating a camera taking panoramic pictures and also a film winding mechanism of the camera which is of a simple and economical construction.

With these and other objects and advantages in view the invention embodies a cylindrical casing having a spring with a gear and winding stem on one side and a gear train on the other with the gear train positioned to rotate the casing around a spindle on a stand and also adapted to rotate a film winding mechanism in a camera positioned on the stand.

Other features and advantages of the invention will appear from the following description taken in connection with the drawings wherein:

Figure 1 is a side elevational view showing a camera positioned on a casing with the casing mounted on the upper end of a tripod.

Figure 2 is a similar view showing a front elevation of the device.

Figure 5 is a sectional plan taken on line 5—5 of Figure 3 showing the worm for rotating the housing and operating the control device.

Figure 6 is a detail showing a shield positioned over the inside of the film opening of the camera.

Figure 3:
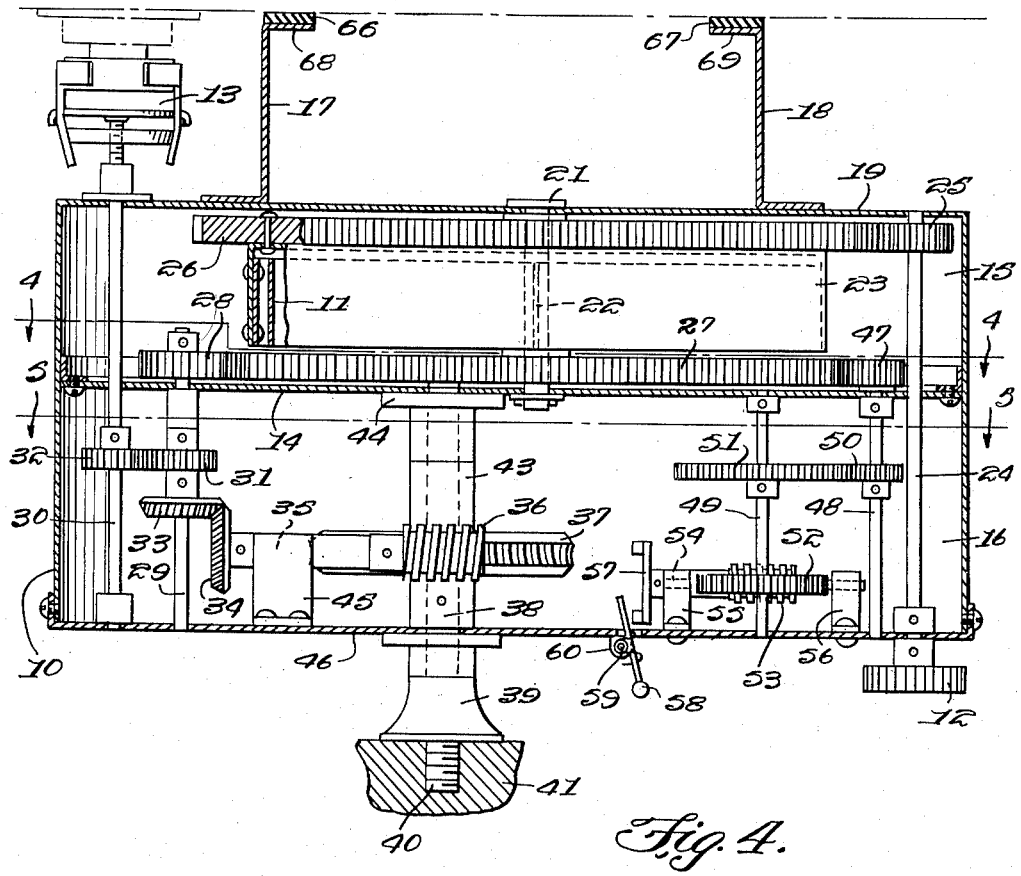
Figure 3 is a vertical section through the gear and spring housing illustrating the relative positions of the parts.
Figure 4:
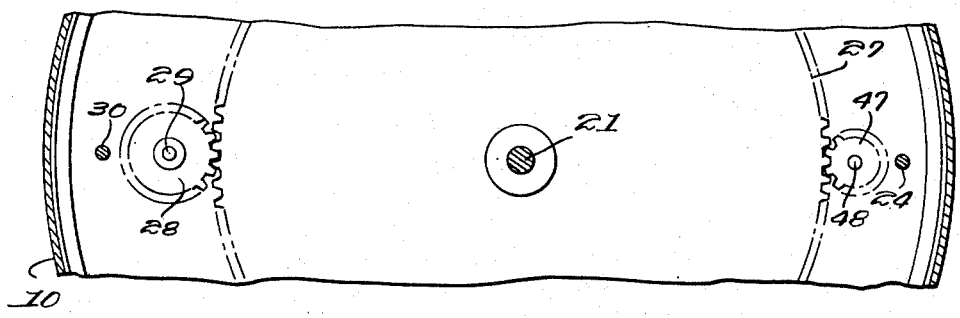
Figure 4 is a sectional plan taken on line 4—4 of Figure 3 showing the gears on one side of the spring.

Referring now to the drawings wherein like reference characters denote corresponding parts the panoramic picture taking camera operating instrumentalities of this invention includes a gear and spring housing 10, a spring 11, a winding knob 12, and a film winding key 13.

The housing 10 is provided with an intermediate partition 14 providing an upper spring compartment 15 and a lower gear compartment 16, and supports 17 and 18 are provided on the upper end 19 of the housing for a camera 20.

The spring 11 is mounted on a shaft 21 with the inner end of the spring positioned in a slot 22 in the shaft and with the outer end of the spring secured to a casing 23 which is rotatably mounted on the shaft 21. The winding knob 12 is mounted on a stem 24 that rotates a casing 23 through gears 25 and 26 for winding the spring.

A gear 27 is mounted on the shaft 21 and this gear is positioned to mesh with a pinion 28 on a shaft 29 which rotates a shaft 30 through gears 31 and 32, and the shaft 30 extends through the upper end of the housing, as shown in Figure 3. The film winding key 13 is threaded on the upper end of the shaft 30 and as the spring unwinds the key 13 actuates the film through the camera.

The shaft 29 is also provided with a beveled gear 33 that meshes with a similar gear 34 on a shaft 35 and the shaft 35 is provided with a worm 36 that meshes with a worm gear 37 on a spindle 38. The spindle 38 is provided with a base 39 with a threaded stud 40 at the lower end and the stud is threaded into the upper end 41 of a tripod having legs 42. With a hub 43 of the gear 37 secured to the housing by a flange 44 the rotation of the gear causes the housing to rotate on the spindle 38, as illustrated in Figures 1 and 2. The shaft 35 is journaled in a bearing 45 mounted on the lower end 46 of the housing.

The gear 27 also meshes with a pinion 47 on the upper end of a shaft 48 and the shaft 48 drives a shaft 49 through gears 50 and 51. The shaft 49 is provided with a worm gear that meshes with a worm 53 on a shaft 44 that is journaled in bearings 55 and 56 on the base 46. A governor 57 is provided on the shaft 54 and a starting lever 58, pivotally mounted on a pin 59 in a projection 60 on the base 46 is positioned to engage the governor to start and stop the device.

A shield 61 having a film slot 62 therein is provided and the shield is positioned on the inside of the camera with the slot 62 positioned to register with film slot through the wall of the camera.

A brace 63 with a thumb screw 64 in the upper end 65 is mounted on the upper end 19 of the housing for clamping the camera against the supports or pads 66 and 67 on the upper ends 68 and 69, respectively of the supports 17 and 18.

With the parts arranged in this manner the spring is wound by the knob 12 and when the governor is released by the lever 58 the spring actuates the gear 27 which rotates the gears 28 and 47 with the gear 28 rotating the film winding mechanism of the camera through the key 13 and also rotating the housing about the spindle through the worm gears 36 and 37.

The governor 57 controls the speed and the device may be stopped and started by the lever 58.

With the camera set for taking a picture the governor is released by the lever 58 and as the camera moves around the film passes through the camera, the film travel being synchronized with the travel of the camera.

It will be understood that modifications may be made in the design and arrangement of the parts without departing from the spirit of the invention.

What is claimed is:

In a panoramic camera spring motor, the combination which comprises a horizontally disposed cylindrical housing having a horizontally disposed partition therein dividing the housing into an upper spring compartment and a lower gear compartment, a shaft journaled in the upper compartment, a spring positioned around said shaft with the inner end attached to the shaft, a spring casing positioned over the spring and attached to the outer end thereof, an operating gear mounted on the said shaft and positioned in the upper spring compartment, a winding gear mounted on the said spring casing and also positioned in the upper spring compartment, camera mounting brackets positioned on the upper end of the said cylindrical housing, a film winding shaft journaled in the said cylindrical housing and extended for engagement with a film winding key of a camera positioned on the said camera mounting brackets, gears meshing with the gear on the shaft upon which the spring is mounted, and a gear on the said film winding shaft for rotating the film winding shaft, a spindle extended through the said gear compartment of the housing and journaled in the said housing, a worm gear on said spindle, a worm actuated by the gears for rotating the said film winding shaft meshing with the said worm gear on the spindle for rotating the housing on the said spindle, a governor in said gear compartment, gears meshing with the said gear on the shaft on which the spring is mounted and operatively connected to said governor, and a spring winding stem having a knob on the outer end and a gear on the inner end journaled in the said housing and positioned with the gear on the inner end meshing with the gear on the said spring casing.

LOUIS J. COMBE.

REFERENCES CITED

The following references are of record in the file of this patent:

UNITED STATES PATENTS

| Number | Name | Date |
|---|---|---|
| 908,091 | Groff | Dec. 29, 1908 |
| 933,801 | Verbeck | Sept. 14, 1909 |
| 1,503,437 | James | July 29, 1934 |
| 2,111,854 | Gasso | Mar. 22, 1938 |